United States Patent [19]

Norris

[11] Patent Number: 4,977,528

[45] Date of Patent: Dec. 11, 1990

[54] APPARATUS AND METHOD FOR DETERMINING THE AMOUNT OF MATERIAL IN A TANK

[75] Inventor: Stephen G. Norris, Kinnoull, Scotland

[73] Assignee: Veeder-Root Limited, Smethwick, England

[21] Appl. No.: 247,776

[22] Filed: Sep. 22, 1988

[30] Foreign Application Priority Data

Sep. 23, 1987 [GB] United Kingdom ............... 8722414

[51] Int. Cl.$^5$ ........................... G01F 23/00; F15B 5/00
[52] U.S. Cl. ............................. 364/571.04; 364/509;
73/1 H; 73/3; 340/612; 340/618
[58] Field of Search ................... 364/571.01, 571.04,
364/571.05, 509; 340/612, 618, 619, 620; 73/1
H, 3, 304 R, 304 C

[56] References Cited

U.S. PATENT DOCUMENTS

| | | | |
|---|---|---|---|
| 4,349,882 | 9/1982 | Asmundsson et al. | 364/509 |
| 4,555,941 | 12/1985 | Fathauer et al. | 364/509 |
| 4,589,007 | 5/1986 | Pope | 364/509 |
| 4,590,575 | 5/1986 | Emplit | 364/509 |
| 4,706,203 | 11/1987 | Ramsdale et al. | 364/509 |
| 4,716,536 | 12/1987 | Blanchard | 364/571.04 |
| 4,736,329 | 4/1988 | Ferretti et al. | 364/509 |
| 4,788,648 | 11/1988 | Ferretti et al. | 364/509 |
| 4,789,946 | 12/1988 | Sinz | 364/509 |
| 4,819,483 | 4/1989 | Emplit et al. | 364/509 |

FOREIGN PATENT DOCUMENTS

| | | |
|---|---|---|
| 3326719 | 1/1984 | Denmark . |
| 1575548 | 9/1980 | Fed. Rep. of Germany . |
| 617008 | 4/1980 | Switzerland . |

*Primary Examiner*—Gary Chin
*Assistant Examiner*—Brian M. Mattson
*Attorney, Agent, or Firm*—Chilton, Alix & Van Kirk

[57] ABSTRACT

In order to determine the contents of a tank fitted with liquid level sensors and metering equipment, a microprocessor is programmed with an algorithm employing a mathematical expression for initially computing data value based on liquid level sensor outputs and tank dimensions, which data values are compared with actual volumetric amounts of liquid in the tank derived from the metering equipment so as to determine errors in a calibration characteristic for converting the sensor outputs into volumetric amounts. The calibration characteristic is refined by an iterative technique where constants in the mathematical expresson are varied, in accordance with the program so as to make the computed data values closer to the actual volumetric amounts derived from the metering equipment for respective liquid levels in the tank.

6 Claims, 4 Drawing Sheets

APPARATUS AND METHOD FOR DETERMINING THE AMOUNT OF MATERIAL IN A TANK

This invention relates generally to apparatus and to a method for determining the amount of material in a storage tank. The invention may be used to calibrate sensing means of a kind which provides an output depending on the sensed amount of material in the tank.

A conventional technique for determining the amount of liquid contained by a tank employs a liquid level sensor. For example, a sensor may be used which comprises a float, or capacitance probes. Either of these sensors provides an output having a value depending on the height of the liquid in the tank. Such a sensor may be calibrated by (a) measuring the dimensions of the tank, (b) calculating, on the basis of the dimensions, volumetric quantities of liquid in the tank corresponding to different liquid levels, and (c) relating the calculated quantities to the liquid level output of the sensor. In effect, a graph can be plotted which relates the calculated quantities to the sensor output for different liquid levels so as to provide a continuous "characteristic" or calibration curve. The calibration of the sensor may be effected, in practice, by a technique of interpolation, e.g. to avoid actually plotting a graph, and/or to avoid making a multiplicity of calculations for different liquid levels. The sensor may be connected to circuitry which converts a sensed value into an output representing an amount of liquid in a tank of given dimensions. Such an output may be used by an analog or digital display in order to indicate the amount of liquid in the tank.

Liquid storage tanks are normally cylindrical in shape with spherical ends. They are often supported so that the cylindrical axis is horizontal. For example, an underground tank, used for storing petrol in a filling station, may have such a shape and orientation. However, such tanks very rarely, if ever, conform to a theoretical shape. Also, they can become dented or otherwise distorted, and they do not necessarily sit squarely in the ground. This means that theoretical calculations of volumetric quantities can be inaccurate and can lead to errors in calibrating a liquid level sensor for use with a particular tank. At least one aspect of the invention seeks to solve this problem.

While an example of a conventional technique has been described above in connection with liquid level sensing, it will be understood that the invention can be more broadly applied For example, the material stored in the tank may be either gaseous, or a solid in the form of, for example, granules or powder which can flow. With gaseous material, a pressure sensor may provide an output proportional to the amount of material in the tank. With a flowable solid, an ultrasonic sensor may provide an appropriate output (although some forms of stirring or vibration may be required to provide a measurable level).

U.S. Pat. No. 4349882 describes a liquid level measuring system in which a microcomputer periodically measures the capacitance of each sensing level of a multiple segment capacitance probe in a storage tank in order to calculate the level and thereby the volume of fuel in the tank. Back-up volume tables preloaded in an EPROM, which give the nominal volume of the tank at each of a plurality of sensing levels and which are predetermined from the nominal length and diameter of the tank, are used for calculating volume of fuel within the tank and for interpolating incremental volumes between calibration levels. In addition, a tank delivery totalizer enables volume calibration data to be computed for each of the calibration levels.

According to the invention, apparatus is provided for calibrating sensing means of a kind which provides an output depending on the amount of material in a tank, the apparatus comprising a first input for receiving outputs from the sensing means, a second input for receiving outputs from metering means used to meter volumetric quantities of material into or out of the tank, and processing means that are operative:

(a) to store a first set of data values related to outputs from the sensing means which represent initial estimates of respectively different amounts of material in the tank, (b) to store a second set of data values derived from the metering outputs and related to the amounts of material sensed in the tank by the sensing means, (c) to compare the first and second sets of data values in order to compute errors in the first set of data values with respect to the second set of data values, (d) to vary the data values in the first set so as to cause new data values to be stored and to be compared with corresponding data values in the second set to determine if there has been any improvement; the new data value being stored where there is an improvement and the old data value being retained where there is no improvement; the first set of data values which contain the improvements then being employed to provide a corrected calibration characteristic for the sensing means, (e) to refine the corrected calibration characteristic by again varying the first set of data values and repeating the process of comparing the first and second sets of data values and storing a fresh set of first data values containing any further improvements, (f) to compute the correlation between the first and second sets of data values, after each comparison, to determine when there is no further or significant improvement in the calibration characteristic, and (g) to store the refined and corrected calibration characteristic.

The invention also provides a method of calibrating sensing means for providing an output depending on the amount of material in a tank, the method including the steps of providing metering outputs which represent volumetric quantities of material metered into, or out of the tank; comparing values derived from outputs of the sensing means with values derived from the metering outputs and related to the amounts of material sensed in the tank, and providing a corrected calibration characteristic for the sensing means with regard to the comparison of the latter values; the method further including the steps of varying the values derived from the output of the sensing means and comparing the varied values with values derived from the metering output and repeating this process until there is no significant improvement in the calibration characteristic.

By suitably reducing and/or increasing the amount by which the data values in the first set are changed for each iteration of the process of refining the calibration characteristic, the calibration characteristic is gradually improved to a required degree of accuracy. The point at which there is no overall or significant improvement in the refined calibration characteristic may be determined by computing the correlation between the first and second sets of data values after each iteration of the process and then stopping the process when there is no significant change in correlation, or when the correlation is acceptable.

The correlation may be computed, for example, by calculating the sum of the squares as the errors for the data values in the first set for each iteration of the process.

The invention is particularly useful for measuring the contents of a tank containing a liquid such as petroleum fuel, the tank usually being of a cylindrical construction. In this case, and as explained further below, a mathematical expression can be derived relating to the geometry and dimensions of the tank in order to derive the first set of data values, i.e. as the first approximation of the volumetric quantities in the tank at different liquid levels. However, with regard to the broader aspect of the invention, it is not essential to make initial calculations in such theoretical detail. For example, if the diameter of a cylindrical tank is known together with its total volumetric capacity, it is possible to start with only one reasonably accurate figure, i.e. the mid-point of the sensing axis passing diametrically through the tank which corresponds with half of its total contents. For sampling points on each side of the mid-point of the sensing axis, approximate data values in the first set (which may be roughly calculated or read from a table giving values thought to be approximate) will be quickly updated as the metering output provides more data to the processing means. Clearly, this data will relate to changes in liquid level on each side of, and adjacent to the mid-point of the sensing axis. However, liquid is usually pumped out of a tank, past its mid-point, in practice. This enables the liquid level sensor to be easily calibrated while the tank is in normal use.

Even where the tank diameter and its total volume are not known accurately, or where drastic errors may be present (e.g. the tank diameter may be approximately correct but its volume may be far greater, or far less than it thought—which can be the case with an underground tank), the invention can still be applied with the same minimal starting data in order to calibrate the liquid level sensor. In this case, where the tank diameter may be approximately correct, either the processing means may be manually supplied with data relating to a tank of, for example, a greater volume, (e.g. by inputting a new volume by means of a keyboard), or the processing means may be programmed to change the respective parameters used in the algorithm to achieve a 'better' fit for the first set of data values. A more suitable set of first data values is provided in each case. Conversely, the processing means may be manually supplied with data relating to a different tank diameter, or programmed to change the respective parameters used in the algorithm if data relating to its total volume remains unchanged.

In the case of these approximations, i.e. where data is limited, or the shape and dimensions of a tank are not well known, it will be understood that a first set of very approximate data values will still enable the process to start, since one or two iterations will soon either correct the process or indicate that there is a problem.

The invention could also be applied where the shape and/or dimensions of the tank are unknown. For example, the metering output could be used to provide a first set of data values as the tank is filled from empty to full. The processing means could be 'told' when the tank is full if it is necessary to provide a total volume (e.g. to prevent overfilling). Alternatively, after filling the tank, it could be drained to provide metering outputs and, hence, the required first set of data values.

In some cases, the refined calibration characteristic may only be operative over a region of the tank over which a material level normally fluctuates. For example, underground petroleum storage tanks are never emptied to avoid the possibility of entraining any water which could sink to the bottom of the tank. They may also never be entirely filled. Thus, the metering output would only help to calibrate those sensing levels over which petroleum is metered. However, the levels on each side of a working region could be calibrated whenever more petroleum than usual was added or extracted.

Since the invention enables a very accurate calibration characteristic to be obtained, it can be advantageously used to detect a small leakage or unaccounted loss of material from the tank (e.g. due to pilfering). More particularly, the processing means is programmed to store, over a predetermined period, any differences between the data values derived from the metering output and the data values derived from the sensing means and computed on the basis of the latest calibration characteristic. These differences are averaged over the predetermined period and the average difference value is compared with a reference value to determine any significant change which is due to a leak or an unaccounted loss of material. The averaging of the differences over the predetermined period allows for slight discrepancies, e.g. due to movement of material in the tank, air bubbles, changes in pressure, etc. However, changes due to ambient conditions, such as temperature, are preferably compensated by supplying the processing means with a temperature sensing input and programming it to change the first set of data values accordingly (i.e. to allow for expansion or contraction of the tank's dimensions as well as the material in the tank). An advantage of this technique is that a leak can be detected without closing down the station as would otherwise be the case where, for example, the tank needs to be sealed and pressurized and then left for a period to detect a loss of pressure.

Preferably, the data values in the first set are varied by a predetermined amount by varying one or more constants in a mathematical expression which is used for converting the sensing output into data representing volumetric amounts in the tank. For example, the sensing output may represent the height of a liquid level in the tank, or the pressure of a gas in the tank and this may be converted into a volumetric amount of the basis of the dimensions of the tank. In the case of a cylindrical tank with domed ends, a mathematical expression can be derived relating the geometry and dimension of the tank to volumetric amounts for (e.g.) different liquid levels. Such an expression may contain (e.g.) two constants, either or both of which may be varied in turn, by a predetermined amount so as to provide different and respective volume values for given liquid levels. This is advantageous where the sensing means is primarily calibrated so as to provide a sensing output related to volumetric amounts of material in the tank at predetermined calibration points (e.g. equally spaced points over the diameter of a horizontally disposed cylindrical tank). The primary calibration may contain errors which are due, for example, to distortion or mis-orientation of the tank and the processing means is used to store an initial record of sensing outputs for given calibration points and to revise corresponding volumetric data values by making changes in the appropriate conversion factor.

In practice, the first and second sets of data values represent changes in tank contents For example, the first set of data values may be derived by subtracting signal B from signal A, where B is derived subsequent to A with regard to consecutive calibration points in the tank, i.e. as the tank is emptied The second set of data values may be derived by subtracting a metering signal D from a metering signal C, with regard to total metered volumes, as the material is withdrawn from the tank. (The reverse would apply where the tank is filled rather than being emptied.) As explained above, one of the data values, e.g. the middle data value in the first set, may be used as a reference or basis for computing an actual volumetric amount of material in the tank whereby the data values represent volumetric changes in the amount of material in the tank.

One of the advantages of the first aspect of the invention is that it can be embodied in the form of a "black box" (i.e. a calibration instrument) which can be temporarily installed, on site, in order to provide a corrected calibration characteristic which can be later implemented by suitable hardware. For example, where the invention is applied for calibrating sensing means attached to an underground petrol storage tank, the "black box" may comprise a microprocessor having data inputs for receiving (a) outputs from liquid level sensing means, and (b) signals from kiosk equipment connected to a petrol pump fitted with means for metering the volume and price of petrol dispensed. In this regard, it can be seen that no special metering means are required because the metering means installed "on site" are used to provide a metering output. The microprocessor is programmed to process the data inputs in order to derive and then store in a suitable memory 9, e.g. in a PROM, data values corresponding to the corrected calibration characteristic. After the "black box" has been installed for a predetermined length of time, e.g. to enable several cycles of tank filling and emptying to occur, the "black box" is removed and the PROM memory 9 is employed, e.g. with another microprocessor which is conditioned to provide output signals for operating a display, to indicate the amount of petrol in the tank.

An early warning of an unusual condition, e.g. such as the leak in the tank could also be detected by comparing printouts of correlations between sensing outputs and metering values of the "black box" over a certain period of time. However, the averaging technique mentioned above is preferred.

Both the apparatus and the method of the invention may be further improved by including means for removing obvious inconsistencies in the sensing outputs, e.g. when a discontinuity such as a step change is detected. This could be done manually, or automatically, e.g. by comparing actual sensing outputs with predicted sensing outputs to determine a difference which exceeds a predetermined error. Temperature compensation can also be made to correct the sensing outputs for changes in temperature.

The calibration characteristic can be refined by varying the first set of data values (i.e. those derived from the sensing output), over a range of tank contents from near empty to full. Alternatively, instead of having one calibration point for each (theoretical) segment of the tank over such a range, a plurality of calibration points are assigned to each tank segment, and these are used to derive the first set of data values. Each segment of the tank can be treated in a similar way so that sufficient data can be collected over one tank "full—empty" cycle and then analyzed to provide optimum sensing outputs, for each tank segment, in order to generate an even more accurate calibration characteristic.

The apparatus and the method of the invention may include means for producing a hard copy report which shows the correlation between sensing outputs and metering values, together with the overall volumetric amount withdrawn or put into the tank and an indication of measurement error. Such a report may be produced automatically, or on request, each time the tank has been emptied or filled with material. As an alternative, or in addition to providing a hard copy report, the data for a report may be stored in memory until it is collected, e.g. by hand, or by a telecommunication link. In the latter case, the report data may be transmitted to a central data collection/computer system which is programmed to check the contents and conditions of tanks at a multiplicity of locations.

In some applications of the invention, when the tank is empty, the sensing output may be taken as a "zero" or an "empty" reference and, when the tank is full, the sensing output may be taken as a "full" reference. Then, either as the tank is filled or emptied, the metering outputs may be periodically related by e.g. a microprocessor to corresponding sensing outputs. This could be done at timed intervals, e.g. over a period during which the tank is filled at a uniform flow rate. Alternatively, predetermined sensor outputs (e.g. obtained when predetermined levels of material in the tank are detected) could be used to initiate instantaneous comparisons with corresponding metering outputs. The microprocessor can be programmed to store corresponding sets of sensing and metering outputs, and to interpolate (if necessary) between the stored values, so as to provide signals, in response to subsequent sensing outputs, for driving a display of tank contents. This could be advantageously used to provide (e.g.) a fuel gauge for a tank having a complicated or irregular construction. The metering means could be removed after enough data had been stored for initially calibrating the fuel gauge (since the microprocessor then needs only to respond to the sensing output to provide a drive for the display).

An example of the invention will now be described with reference to the accompanying drawings which schematically illustrate an embodiment of the invention for use in calibrating tank level sensing means in a petrol filling station.

Figure 1:
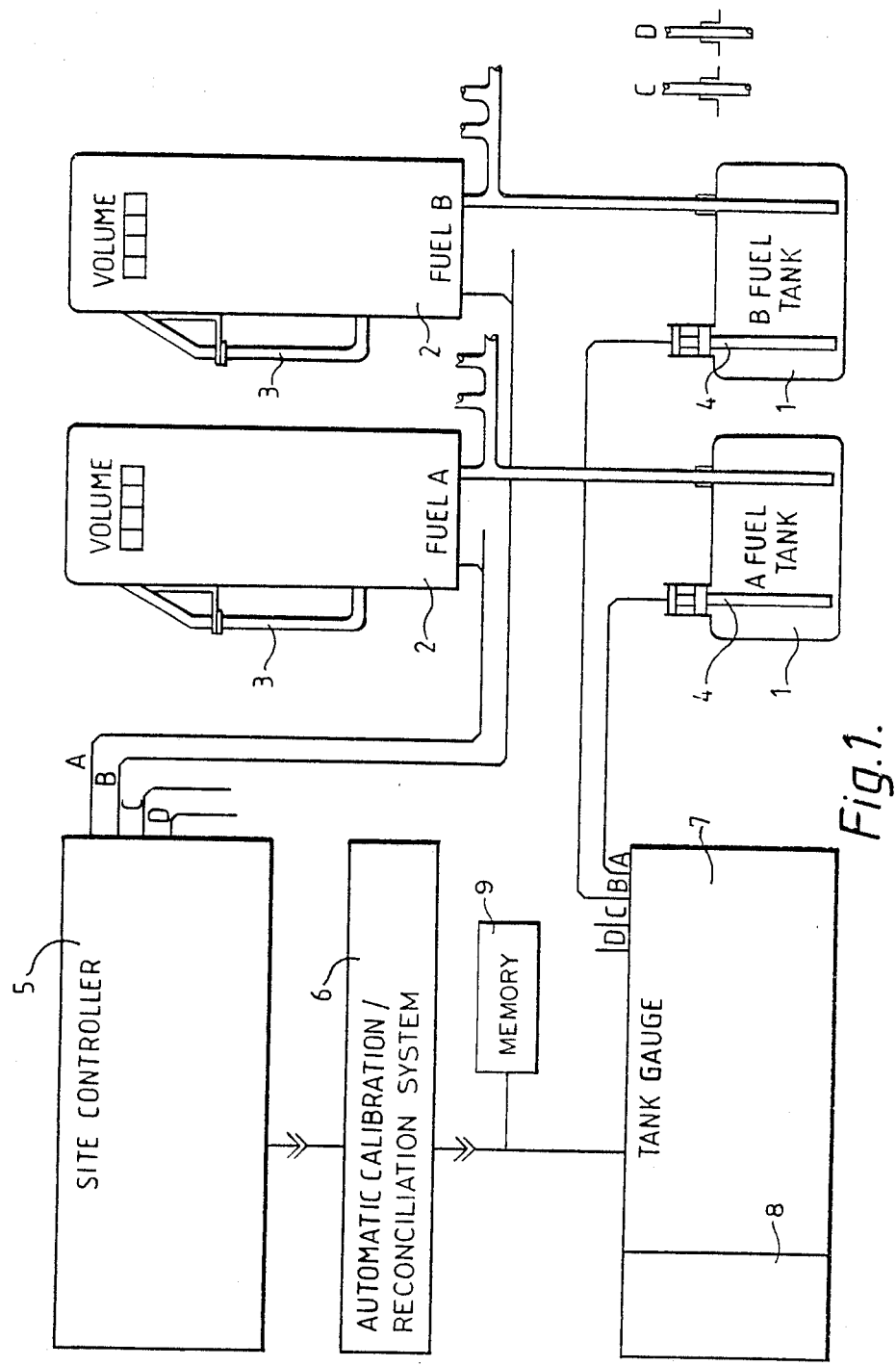
FIG. 1 shows a system embodying the invention.

Referring to FIG. 1, underground storage tanks 1 are each in fluid communication with a respective dispenser 2 having a dispensing hose and nozzle 3. Tanks 1 and dispensers 2 are of conventional construction. Each dispenser 2 comprises a pump, valves and metering means for metering the quantities of petrol dispensed and may be one of several connected to a kiosk/site controller 5. The kiosk/site controller 5 is of conventional construction and includes means for displaying the volumes and costs of amounts dispensed by each dispensers and the total volume dispensed by every dispenser connected to the same tank. The latter means includes conventional circuitry for providing data, i.e. "metering values" corresponding with the total volumes dispensed.

Tank level sensing means 4, of known construction, is installed in each tank 1. Means 4 comprises a transducer (e.g. capacitance probe) for providing electrical signals in response to changes in the level of the liquid within tank 1. It also comprises a microprocessor for converting these electrical signals into other signals or data representing a volumetric amount of material in tank 1 with respect to a corresponding liquid level. Such a microprocessor employs a "conversion factor" based on a relationship between liquid level and the geometry and physical dimensions of the tank. The level sensing means 4 used in this example was a TLS-250 Tank Level Sensor available from Veeder Root, 70 Sargeant Street, Hartford, Conn., U.S.A. Data representing volumetric amounts of material in each tank 1 and derived from the liquid level signals are supplied to a calibration box or automatic calibration/reconciliation system 6 which also receives data signals from the site controller 5 representing the "metering values" or total volumetric amounts of petrol dispensed by the dispensers 2 connected to the respective tanks 1. The calibration system 6 (which may include A/D converters as required, i.e. if the signal inputs are in analog rather than digital form), thereby receives concurrent signals or data relating liquid levels in tanks 1 to volumetric amounts dispensed by dispensers 2. A tank gauge 7, which displays the amounts of material in each tank 1 relays the liquid level signals from the sensing means 4 to the calibration system 6. Tank gauge 7 also comprises a printer 8, the purpose of which is explained below.

In the example described, sensing means 4 and the calibration system 6 both incorporate microprocessors which are programmed to perform the following functions.

Sensing Means 4

An algorithm is used to relate liquid level to the volume of liquid in tank 1. The algorithm operates on input signals from the transducer of the sensing means 4 and on theoretical volumes calculated for a "standard" tank which has a certain shape and size and which is disposed with its cylindrical axis in the horizontal plane. This data is supplied (e.g. by a keyboard) to the microprocessor in the form of theoretical volumes of liquid for each of 20 calibration points spaced across the diameter of the tank (which diameter is assumed to be in the vertical plane). Each calibration point can be checked by means of a dipstick, and the theoretical volume, for that liquid level, can be obtained from a tank chart (supplied by the tank manufacturer) for relating a liquid level to a calculated volume. The algorithm interpolates for liquid levels between adjacent calibration points in order to provide liquid volumes for any transducer input signal.

This "conversion" of liquid level (transducer signals) into corresponding volumetric amounts is theoretically sound for a "standard" tank having a perfect cylindrical shape, perfectly spherical domed ends and which disposed with its cylindrical axis in the horizontal plane. However, mass-produced tanks will not conform identically with the "standard" tank, and they may be distorted in shape or have dents or other defects. Moreover, in practice, a working tank may not be installed so that its cylindrical axis is in the horizontal plane. Thus, with a working tank, it is possible that the relationship of liquid level to volume at or between the calibration points is not exactly the same as the algorithm believes it to be. Therefore, the volumes determined by the microprocessor may only be taken as approximate or estimated values, and the calibration system 6 is used to correct for errors.

Calibration system 6

The microprocessor is programmed on the basis of the following two assumptions:
(a) The volume displayed by totalizers in the kiosk equipment or site controller 5 is always correct (this must be achieved, in practice, to ensure that the correct cost is displayed for volume dispensed), and
(b) The liquid levels sensed by the liquid level sensing means 4 are always correct.

These assumptions are valid, in practice, because:
(a) The metering means in dispensers is accurate to within plus or minus 0.03%, and it has very little short term drift, and
(b) While the liquid level/volume "sensing outputs" of sensing means 4 may not be correct the repeatability of sensing/detection is excellent.

The "metering values" derived from the kiosk equipment or site controller 5 may therefore be used to calibrate the sensing means 4 to correct for errors unless some unusual condition prevails, such as a leak in the tank 1. (This means that "reports" provided by the calibration box can provide an early warning about the state of the tank.)

The microprocessor program operates in the following way.

The data collected by the site controller 5 and the sensing means 4 is used to construct a file (e.g. in a PROM) which relates Pump Tote (litres) to liquid level (mm) as shown below. (This data is collected from the Pump Tote at regular metered intervals (e.g. every 200 litres). Data representing corresponding liquid levels (mm), as detected by the sensing means 4, is collected at the same times.)

| Record No. | Pump Tote (ltrs.) | Liquid level (mm) |
|---|---|---|
| 1 | 2000 | 2480 |
| 2 | 2200 | 2422 |
| 3 | 2400 | 2372 |
| 4 | 2600 | 2341 |
| 5 | 2800 | 2308 |
| 6 | 3000 | 2279 |
| . | . | . |
| . | . | . |

The primary calibration data of the sensing means 4 is also stored, i.e. which relates liquid level (mm) to volumetric amounts (liters) in the tank since this data will be revised to provide a more accurate calibration characteristic for the particular tank. The microprocessor of the calibration system 6 is also programmed with the algorithm for converting this data into volumetric amounts since this algorithm will be used in revising the calibration characteristic.

Once this data has been collected, the program in the calibration system 6 performs the following tasks.

1. It computes, for each calibration point (i.e. by interpolation), the following information:
   A. Volume dispensed (in liters) between adjacent calibration points as determined by a change in the total volumetric metered amounts (i.e. present metering value minus previous metering value)

B. Volume change (in liters) as determined by the sensing means 4 based on the primary calibration C. The Absolute Error in B wit respect to A D. The percentage error of C.

The program in the microprocessor of calibration system 6 also computes, over the range of calibration points, the correlation between the total volume of liquid dispensed, as determined by the metering means (2, 3) and the total volume of liquid removed from the tank 1, as determined by the sensing means 4. This correlation may be computed, for example, by computing the sum of the squares of the errors (C or D) over the range of calibration points.

2. It computes new data values by first varying, by a predetermined amount (e.g. plus or minus 3%), one or more constants in the mathematical expression which was used in the algorithm for computing the primary calibration values of the sensing means. In other words, the calibration points (mm) are fixed, but the (theoretical) corresponding volumes (in tank 1) are varied to provide and to store new calibration values. These new calibration values are then used to compute new volume changes $B_1$ for the sensing means 4. These values $B_1$ are then compared, in turn with the corresponding values A to determine the errors C and D. If there has been an improvement, the new value for the volume of liquid in the tank (corresponding to the appropriate calibration point for the liquid level sensing means) is stored (in a PROM) as a more accurate value for the corresponding segment of the tank. If there is no improvement, the previous value for the volume of liquid in the tank (corresponding to the same calibration point for the sensing means) is retained in the store. This process, which may be termed "an iteration", is repeated for each change in the constants in the mathematical expression (conversion factor). For example, where two constants $k_1$ and $k_2$ are involved, the first iteration is carried out with $k_1$ varied by +3%. In the second iteration, $k_1$ is the original constant, but $k_2$ is varied by +3%. Then, both $k_1$ and $k_2$ are varied by +3%. These iterations can then be repeated with a change of −3% instead of +3%. The correlation between the total volume of liquid removed from the tank and the total volume of liquid dispensed after each iteration is computed (as before) to ascertain what (continuing) improvement has been made, and the process stops with the best revised data values in store.

3. The program then causes the process (2) to be repeated with a reduction in the step size (3%) by which the constants ($k_1$ and $k_2$) were varied.

4. The program continues with reducing step size and iterating until there is no improvement or significant improvement in correlation.

5. Once the correlation has reached an optimum value, a report is produced as shown below. (The * denotes the number of data points within each segment.)

| Volume Change | Volume Calculated | Volume Difference | Percentage Difference |
|---|---|---|---|
| 1320 | 1320 | −0 | −0.01% |
| 1664 | 1664 | −0 | −0.02% |
| 1914 | 1915 | −1 | −0.05% |
| 2103 | 2104 | −1 | −0.03% |
| 2250 | 2251 | −1 | −0.04% |
| 2360 | 2361 | −1 | −0.04% |
| 2440 | 2441 | −1 | −0.05% |
| 2492 | 2493 | −1 | −0.03% |
| 2516 | 2517 | −1 | −0.03% |
| 2517 | 2517 | −0 | −0.02% |
| 2492 | 2493 | −1 | −0.02% |
| 2440 | 2440 | −0 | −0.01% |
| 2360 | 2360 | −0 | −0.02% |
| 2250 | 2250 | 0 | 0.01% |
| 2103 | 2103 | 0 | 0.00% |
| 1914 | 1914 | −0 | −0.01% |
| 1664 | 1664 | 0 | 0.00% |
| Totals 36799 | 36807 | −8 | −0.02% |

Mean error = 0.02%

(The "volume change" is the volume, in liters, measured by the metering means; the "volume calculated", in liters, is the volume determined by the sensing means from the corrected calibration characteristic. The lines of the table corresponds to the calibration points over the range of measurements - which may be less than the total number of calibration points where the tank is not completely filled or emptied during the calibration process. The "Percentage Difference" shows minute changes for similar "Volume Changed" and "Volume Calculated" figures due to computing more accurate data - e.g. to 12 decimal places.)

| Old | New | |
|---|---|---|
| 39600 | 39600 | |
| 38536 | 38536 | * |
| 37421 | 37421 | ** |
| 35852 | 35852 | ** |
| 34037 | 34037 | ** |
| 32000 | 32000 | ** |
| 29861 | 29861 | ** |
| 27567 | 27567 | ** |
| 25170 | 25170 | ** |
| 22662 | 22662 | ** |
| 20123 | 20123 | ** |
| 17616 | 17616 | ** |
| 15088 | 15088 | ** |
| 12686 | 12686 | ** |
| 10214 | 10214 | ** |
| 8105 | 8105 | ** |
| 5797 | 5797 | ** |
| 4017 | 4017 | ** |
| 2099 | 2099 | * |
| 779 | 779 | |
| 0 | 0 | |

(These "Old" and "New" figures show the tank contents at respective calibration points.)

Data Validity

The program can be designed to filter input data to erase obvious inconsistencies for example when a step change upwards in liquid level (height) is found (due to a delivery into the tank). This can be done manually during the initial measurement period to enable sensible rules to be worked out for the program.

Compensation for the effect of temperature on the accuracy of the data derived from the sensing means may be made as follows.

A temperature sensor is installed in the tank to provide data to the microprocessor in either the sensing means, or the calibration box. Either microprocessor is programmed to make an allowance for the effect of a change in temperature on the "sensing outputs" (which are taken as correct at a predetermined reference temperature).

Alternative Mode of Operation

Instead of changing the constants in the mathematical (conversion) expression for each iteration, data may be collected from the sensing means at a plurality of sampling points for each "segment" of the tank. This data may be analysed by statistical methods in order to determine the best correlations and hence the optimum calibration characteristic.

Station Operation During Calibration

Since the system of data collection can be fully automated, the only requirement of staff personnel "on site" is to check that the calibration box is still working. They can do this by examining a print-out of the "report". Where they will fail to do this, the calibration box can be conditioned to produce a "message" to say that it is "in order" at predetermined time intervals (e.g. every 9 hours). The only other requirement is that personnel allow, within "operational limits", the tank to go from Full to Empty. If they do not do this, then the calibration at the top and bottom of the tank cannot be checked.

Figure 2:
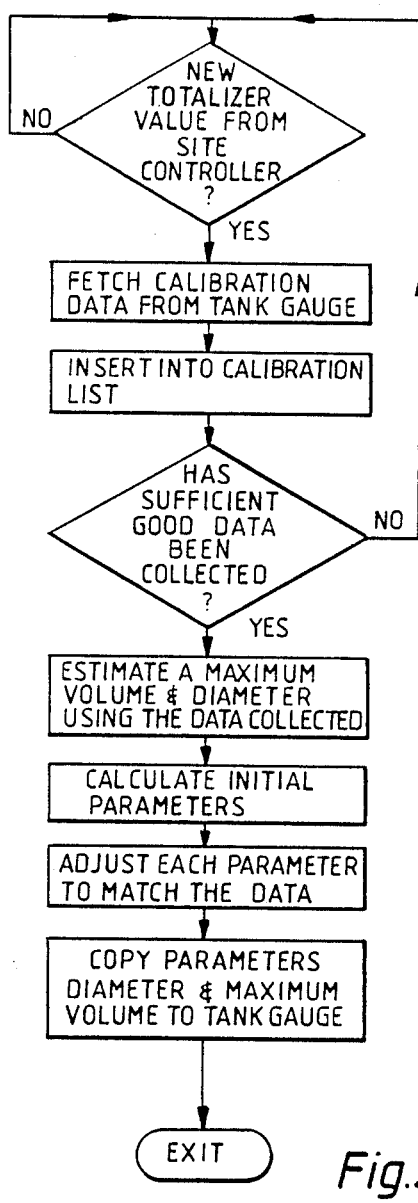
FIGS. 2-4 are flowcharts for explaining a mode of operation of the system of FIG. 1.
Figure 3:
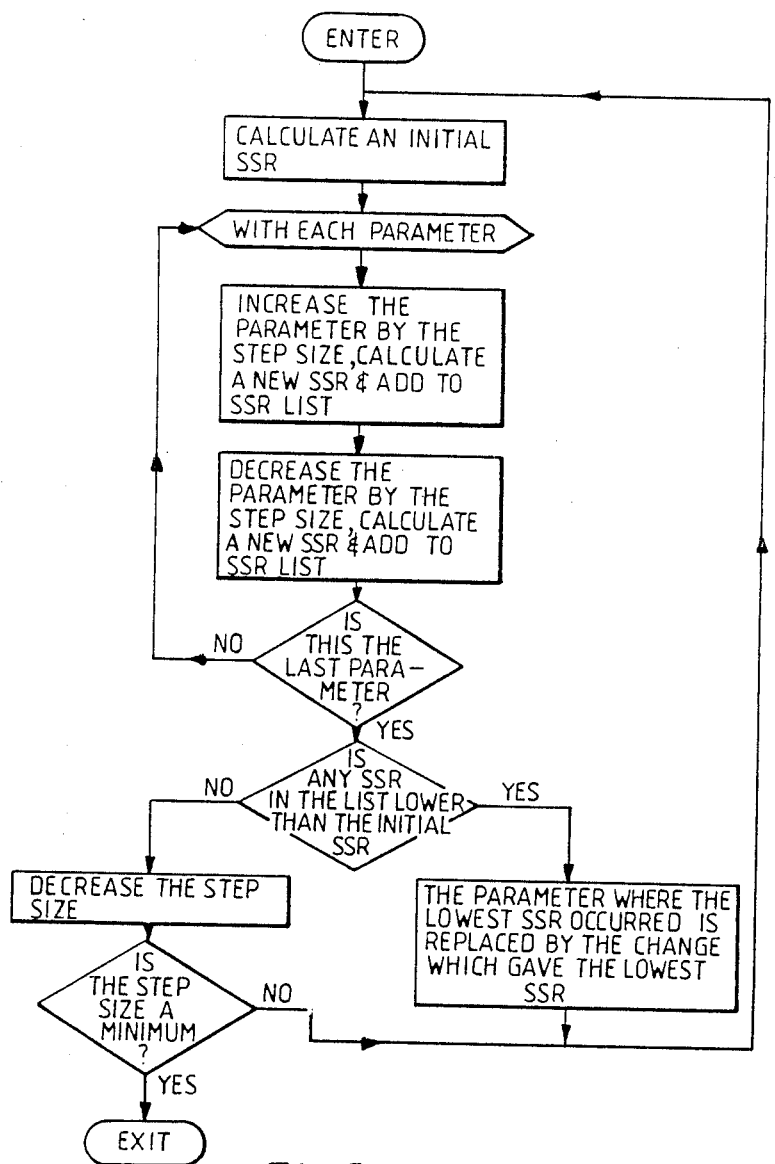
Figure 4:
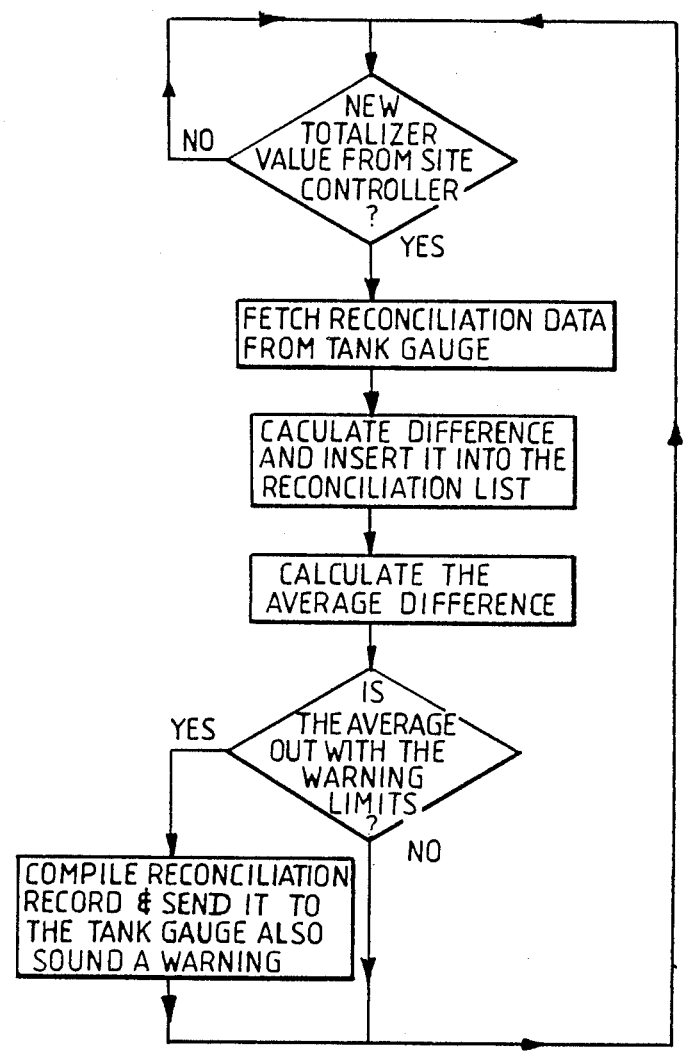

FIGS. 2–4 are flowcharts, illustrating a mode of operation of the system shown in FIG. 1, which mode of operation is basically the same as that previously described except for some refinements. These refinements are made in view of not knowing the precise diameter and maximum volume of an underground tank. The mode of operation "starts" from a point where some calibration data is available from the tank gauge 7, this calibration data being based on dimensions which are thought to apply to the tank and on parameters which would apply to those dimensions at the calibration levels of the liquid sensing means, i.e. as calculated from a 'tank table' or mathematical expression. This serves as a first approximation, although the data may be inaccurate. However, after collecting sufficient data from the totalisers that are driven by the dispensers 2, a good estimate can be made of the diameter and maximum volume of the tank, and this information can be used to modify the initial parameters which are used for computing the volumetric contents of the tank at the calibration levels of the sensing means.

FIG. 2 illustrates a first loop where new totalizer values from the site controller 5 are collected and inserted into a calibration list until sufficient good data has been collected in order to estimate the diameter and maximum volume of the tank. The process then continues by calculating initial parameters in the algorithm to suit a tank of the right dimensions and by adjusting each parameter to match the data derived from the metering outputs. After achieving the best match, the modified parameters, relating to the best tank diameter and maximum volume, are copied into the tank gauge 7.

The iterative process then proceeds much the same as described above. However, FIG. 3 shows a process wherein a parameter of the algorithm used to calculating the volumetric content of the tank at a particular sensing level is both increased and decreased for each iteration, and the respective correlations are computed to determine if either an increase, or a decrease in this parameter has an optimum effect. More particularly, after calculating an initial sum of the squares of residuals (i.e. based on differences between data values derived from the level sensing output and data value derived from metering output), a selected parameter in the mathematical expression used in the algorithm is changed by a predetermined amount, i.e. it is both increased and decreased by the same amount, so that respectively new sums of the squares of residuals (SSR's) can be calculated before determining if any such calculated SSR is lower than the initial SSR before decreasing the size of the step by which the parameter is changed before repeating the process. When the step size is at a minimum, the process stops. At that point, the system is accurately calculated, and it can then move into a reconciliation program, the overall layout of which is shown in FIG. 4.

In the reconciliation program, the calibration system 6 still captures information as it did in the calibration mode, but if there is any significant difference between data collected from the dispensers 2 and derived from the level sensors 4, a warning is given so that action may be taken to check if there is a leak in the system or an unaccounted loss of fuel e.g. due to pilfering. This enables the system to be used for detecting leaks as well as thefts.

In FIG. 4, a reconciliation list is compiled by calculating differences between the volumetric data computed on the basis of the latest calibration characteristic with volumetric amounts calculated from the totalizer information derived from the dispensers 2. Any differences between these two sets of information are averaged, over a predetermined period, and the average is compared with a reference which, if exceeded, causes an alarm or indication to be given (such as a sound alarm) to indicate that there is a leak or loss of material. The length of the period over which the differences are averaged is determined so as to eliminate alarms due to slight changes caused by transient effects (such as movement of the material in the tank). As for changes due to ambient conditions such as temperature, compensation can be carried out so that no alarm is given in the event of changes occurring due to these natural effects.

Appendix

For a cylindrical tank with spherically domed ends, volumetric amounts may be interpolated between measured volumes by the following expression:

$$V_x = (V_2 - V_1)\frac{A_x - A_1}{A_2 - A_1} + V_1$$

where:
$V_x$ = volume of material in tank 1 at height $H_x$
$V_2$ = volume at next highest calibration point $H_2$ above $H_x$
$V_1$ = volume at next lowest calibration point $H_1$ below $H_x$
$A_x$ = cross-sectional area of tank contents at height $H_x$ $A_2$ = cross-sectional area of tank contents at height $H_2$ $A_1$ = cross-sectional area of tank contents at height H where:

$$A = O + (4H_n - 2) H_n(1 - H_n)$$

and:

$O = \cos^{-1}(1 - 2H_n)$ $H_n = H/D$

H being any height $H_1$, $H_2$ or $H_x$, and D being the cylindrical diameter of the tank.

I claim:

1. In a system comprising a tank for storing liquid material, sensing means fitted to the tank for sensing liquid level in the tank and providing first output signals, metering means for metering said liquid material and providing second output signals, and processing means having a first input for receiving said first output signals and a second input for receiving said second output signals, said processing means being operative:

(a) to store a first set of data values which represent initial estimates of volumetric quantities of liquid in the tank corresponding to predetermined liquid levels in the tank as sensed by said sensing means, said processing means being programmed with an algorithm which employs a mathematical expression for computing said first data values from said first output signals based on the dimensions of the tank, (b) to store a second set of data values derived from said second output signals, said second set of data values corresponding with actual volumetric quantities of metered liquid, which volumetric quantities are related to said predetermined liquid levels, (c) to compare the first and second sets of data values in order to compute errors in the first set of data values with respect to the second set of data values, (d) to vary the data values in said first set, by varying at least one constant in said mathematical expression, so as to cause new data values to be stored and then to be compared with corresponding data values in said second set to determine if there has been any improvement; the new data value being stored where there is an improvement and the old data value being retained where there is no improvement; the first set of data values which contain the improvements then being employed to provide a corrected calibration characteristic for said sensing means, (e) to refine the corrected calibration characteristic by again varying the first set of data values and repeating a process of comparing the first and second sets of data values and storing a fresh set of first data values containing any further improvements, (f) to compute a correlation between the first and second sets of data values, after each comparison, to determine when there is substantially no further improvement in the calibration characteristic, and (g) to store the refined and corrected calibration characteristic.

2. Apparatus according to claim 1 wherein said processing means is programmed to collect a plurality of sensing outputs and metering outputs for each segment of the tank and to analyze corresponding data values for generating a corrected calibration characteristic.

3. Apparatus according to claim 1 wherein said processing means is programmed to store, over a predetermined period, any differences between (a) data values derived from said second output signals (b) data values derived from the output of the sensing means and from a current calibration characteristic, said processing means being further programmed to average said differences over said period and to compare an average difference with a reference value to determine if there is any change due to a leak or an unaccounted loss of material from the tank.

4. A method of calibrating sensing means for providing an output depending on an amount of liquid in a tank, the method including the steps of:

providing metering outputs which represent volumetric quantities of metered liquid;

providing liquid level sensing outputs;

computing volumetric quantities of liquid in the tank from a mathematical expression relating the dimensions of the tank to volumetric content and assigning the computed values to the sensing outputs for respective liquid levels;

comparing the computed volumetric quantities with actual volumetric quantities derived from the metering outputs; and providing a corrected calibration characteristic for computing volumetric quantities of liquid in the tank from the sensing outputs;

varying constants in the mathematical expression and iteratively comparing the volumetric quantities derived from the varying step with actual volumetric quantities derived from the metering output until there is no substantial improvement in the calibration characteristic.

5. The method according to claim 4 and further including the steps of storing a corrected calibration characteristic in memory means, removing calibration apparatus from a site at which the tank is installed, and employing said memory means in apparatus installed on site for displaying tank contents.

6. The method according to claim 4 and further including the step of detecting for a leak of unaccounted loss of material from the tank, which step is carried out by comparing, over a predetermined time, actual volumetric quantities derived from the metering output with the values computed from a current calibration characteristic, storing differences determined by the comparing step over said time period, averaging said differences and comparing the average difference with a reference to determine a substantial change.

* * * * *

UNITED STATES PATENT AND TRADEMARK OFFICE
CERTIFICATE OF CORRECTION

PATENT NO. : 4,977,528

DATED : December 11, 1990

INVENTOR(S) : Stephen G. Norris

It is certified that error appears in the above-identified patent and that said Letters Patent is hereby corrected as shown below:

COLUMN 14

Claim 6, line 2, substitute -- or -- for "of" (second occurrence).

Signed and Sealed this

Twenty-fifth Day of August, 1992

Attest:

DOUGLAS B. COMER

Attesting Officer

Acting Commissioner of Patents and Trademarks